Patented Aug. 20, 1929.

1,724,896

UNITED STATES PATENT OFFICE.

ALBERT H. ACKERMAN, OF CHICAGO, ILLINOIS, ASSIGNOR, BY MESNE ASSIGNMENTS, TO ACKERMITE COMPANY, OF JANESVILLE, WISCONSIN, A CORPORATION OF DELAWARE.

COPPER AND LEAD ALLOY AND PROCESS OF PRODUCING THE SAME WITH VARYING PHYSICAL PROPERTIES.

No Drawing. Application filed November 11, 1922, Serial No. 600,408, and in Canada November 21, 1921.

The invention relates to an alloy of lead and copper and process of producing the same, and has as an object the production of such an alloy which will be stable and which may be used as a bearing metal, or for packing metal, or for other purposes.

Many attempts have heretofore been made to produce such a stable alloy, and some have claimed success in the undertaking, but so far as I have been able to find after diligent search no one has ever succeeded in so doing. All of the attempts of which I am aware have resulted in a composition which would separate into its constituent metals by some form of treatment usually upon being remelted but once, since the lead was not so combined with the copper as to prevent its fusing at its normal fusing temperature which is much below that of copper. The alloy provided by the present invention will not segregate under any treatment which has thus far been applied to it although it has been melted and solidified as many as twenty successive times in an attempt to separate it into its constituent metals.

The alloy may be prepared by first preparing what I term a virgin metal and which comprises a major portion of one of the metals and a minor portion of the other metal. This virgin metal is prepared in the molten condition, cast into pigs and cooled to atmospheric temperature. The desired alloy may then be produced by remelting the virgin metal with an additional quantity of the minor metal sufficient to produce the desired result.

One process of making the virgin metal which has given good results, taking one hundred and ten pounds of virgin metal as a unit, is as follows: First make an intimate mixture of the following materials in a dry state, pulverizing each if not already pulverized.

10 ounces plain yellow sulphur_____
16 ounces golden antimony sulphide_ $Sb_2S_5$
8 ounces arsenic sulphide (red)
   Realgar_____ $As_2S_2$
8 ounces arsenic sulphide (yellow)_ $As_2S_5$
14 ounces arsenic trioxide (amorphous) _____ $As_4O_6$ These materials are mixed together in the following manner: The sulphur and antimony sulphide are thoroughly mixed together and allowed to stand for a period of approximately one hour, or a slightly greater quantity say 18 ounces of the second named substance may be used for immediate result.

To the mixture thus formed the red arsenic sulphide is added and well mixed. The yellow arsenic sulphide is then added to the mixture and thoroughly commingled after which the arsenic trioxide is added and thoroughly embodied therein, as evidenced by a resulting light orange color of the preparation.

To produce a virgin metal for preparation of an alloy suitable for bearings or other uses when a rather hard material is desired, of the resultant mixture 60 ounces are taken and enclosed in a parcel, as for instance in a paper package, and placed in the bottom of a crucible. The crucible is then charged with approximately 22 pounds of copper and approximately 88 pounds of lead and covered. The covered crucible is then heated to a temperature of approximately 2000° F., at which temperature it is held for a short time, say from five to ten minutes, the bath being stirred in the meantime, after which the molten mass thus prepared is poured into molds and allowed to cool to atmospheric temperature.

Increasing the percentage of the mixture of chemicals used will result in producing a softer virgin metal, the percentages of the lead and copper remaining the same. To produce such a metal for instance as is suitable for metallic packings, a virgin metal may be prepared by using 68 ounces of the mixture above described.

While the above proportions of ingredients and order of mixing is that now preferred, they may be varied to some extent, or equivalents for some or all of them may be used, without sacrificing the advantage of the invention. In varying the proportions of the named ingredients it is found that the process is most successful if the proportions are kept within the following limits:

|  | Minimum. | Maximum. |
|---|---|---|
| S | 2½ ounces | to 25 ounces |
| $Sb_2S_5$ | 4 ounces | to 26 ounces |
| $As_2S_2$ | 2½ ounces | to 12 ounces |
| $As_2S_5$ | 2½ ounces | to 12 ounces |
| $As_4O_6$ | 4 ounces | to 35 ounces |

The virgin metal thus provided may be stored for use at any desired time, and when an alloy of copper and lead is wanted for any particular service additional copper is placed with the virgin metal, the quantity of copper so added being such as together with the copper and lead in the virgin metal will produce an alloy of the desired percentage of each of the two metals. The virgin metal and the added copper are fused together, which will again require a temperature of approximately 2000° F., at which temperature the molten mass is stirred and held for a short period, say from five to ten minutes, when it may be cast into pigs or run into molds having any desired form.

An alloy thus produced is found to be substantially free from any of the materials used in its preparation, except the copper and lead. Chemical analysis shows, if any, only traces of other substances than the metals forming the alloy, such other substances being present only as impurities. Analysis of the metal which has been produced by the process of the present invention on a commercial scale has regularly proven to have a purity of substantially 99½% lead and copper. The substances other than the metals named which are thus found to exist in the alloy are in quantity not more than the impurities which normally occur commercially in copper and lead. It is believed that the chemicals used in the preparation of the alloy pass off as vapor, or as oxides or other infusible compounds, as slag. The traces of sulphur, arsenic and antimony which analysis reveals in the finished product are not found to be greater than the amounts of these elements found as normal impurities commercially in the metals used.

The alloy thus formed has a fusing temperature of about 1750° F. By virtue of the high fusing point it may be utilized for bearings or packing, instead of bronze, babbitt, or other bearing or packing metal, and may be used with or without lubrication, without wearing or scoring of the moving parts in contact therewith, or of the face of the metal. Also, because of its high fusing point and of its self-lubricating properties it may be used in locations where a bearing becomes heated above the cracking point of oils, without damage to the bearing or to the shaft.

The alloy prepared as described has a compression strength of 19,000 to 40,000 pounds per square inch. It has a low coefficient of expansion and a low coefficient of friction. Its Brinnell hardness shows no appreciable change between temperatures of 75° and 300° F.

Should an alloy be desired which is harder than would result from the amount of copper which it is desired to provide in the finished alloy, the same may be hardened by adding to 280 parts of the alloy from one to two and one-half parts of an intimate mixture of 12 oz. of black antimony (antimony trisulphide, $Sb_2S_3$), 2 oz. of magnesium and 2 oz. of barium bichloride ($BaCl_2$) and fusing the alloy therewith.

Packing metal may be prepared in a desirable manner by a modification of the quantities of the chemicals named above as follows:

16 oz. sulphur.
20 oz. $Sb_2S_5$.
8 oz. $As_2S_3$.
8 oz. $As_2S_5$.
16 oz. $As_4O_6$.

The modified formula used as described for that first given will provide an alloy which has the softer quality desired as a packing metal.

A sample of the metal provided by the invention, when polished, etched by appropriate reagents and examined under a microscope reveals a reticulation very similar to that of steel under the microscope. The lead appears as minute globules imbedded in copper as a matrix.

The fusing points of the substances named which are used to bring about the alloying of lead and copper to produce the virgin metal, range from a little below the melting point of lead to approximately that of copper.

Minor changes may be made in the physical embodiment of the invention or in the steps of the process, without departing from its spirit.

Having thus described my invention, what I claim is:

1. A composition of matter for treating metals comprising essentially substantial amounts each of sulphur, golden antimony sulphide, red arsenic sulphide, yellow arsenic sulphide and arsenic trioxide intimately mixed.

2. A composition of matter for treating metals comprising an intimate mixture of 10 parts of plain yellow sulphur, 16 parts of golden antimony sulphide, 8 parts of red arsenic sulphide, 8 parts of yellow arsenic sulphide and 14 parts of arsenic trioxide.

3. The process of preparing a composition of matter for treating metals which comprises mixing together substantial amounts of each of sulphur, antimony sulphide, red arsenic sulphide, yellow arsenic sulphide, and arsenic trioxide.

4. The process of preparing a composition of matter for treating metals which comprises mixing substantial quantities of sulphur and antimony sulphide, allowing the mixture to stand for a period of upward of one hour, adding to said mixture substantial amounts of each of red arsenic sulphide, yellow arsenic sulphide and arsenic trioxide.

5. The process of preparing a composition of matter for treating metals which comprises mixing substantial quantities of sulphur and antimony sulphide varying the quantity of the latter substance in accordance with the time desired to give to its action, adding to said substantial amounts of each of mixture red arsenic sulphide, yellow arsenic sulphide and arsenic trioxide.

6. The process of producing bearing metal which comprises combining molten copper and lead in the presence of substantial amounts of each of sulphur, sulphide of antimony, sulphide of arsenic and oxide of arsenic.

7. The process of producing bearing metal which comprises combining molten copper and lead in the presence of substantial amounts of each of sulphur, golden antimony sulphide, red arsenic sulphide, yellow arsenic sulphide and arsenic trioxide.

8. The process of producing bearing metal which comprises bringing together, copper and lead with substantial amounts of each of sulphur, sulphide of antimony, sulphide of arsenic and oxide of arsenic in a solid state, then heating the combined substances to the point of fusion of the copper.

9. The process of producing bearing metal which comprises combining a major portion of molten lead with a minor portion of molten copper in the presence of substantial amounts of each of sulphur, sulphide of antimony, sulphide of arsenic and oxide of arsenic, then combining with the resultant metal in molten condition the necessary amount of molten copper to secure the desired physical properties.

10. The process of producing copper-lead bearing metal having an excess of copper which comprises combining copper and lead in molten state with an excess of lead, said combination being effected in the presence of substantial amounts of each of sulphur, sulphide of antimony, sulphide of arsenic and oxide of arsenic, then introducing into the combination while in a molten state sufficient molten copper to produce a copper content in excess of the lead.

11. The process of producing bearing metal which comprises placing in the bottom of a crucible a mixture of substantial amounts of each of sulphur, golden antimony sulphide, red arsenic sulphide, yellow arsenic sulphide and arsenic trioxide, charging the crucible with copper and lead and melting the entire charge.

12. The process of producing bearing metal which comprises melting substantially one hundred parts of copper and lead with substantially four parts of a mixture of the following substances and proportions namely:

| | |
|---|---|
| Sulphur | 2½ oz. to 25 oz. |
| $Sb_2S_5$ | 4 oz. to 26 oz. |
| $As_2S_2$ | 2½ oz. to 12 oz. |
| $As_2S_5$ | 2½ oz. to 12 oz. |
| $As_4O_6$ | 4 oz. to 35 oz. |

In testimony whereof I have affixed my signature.

ALBERT H. ACKERMAN.